UNITED STATES PATENT OFFICE.

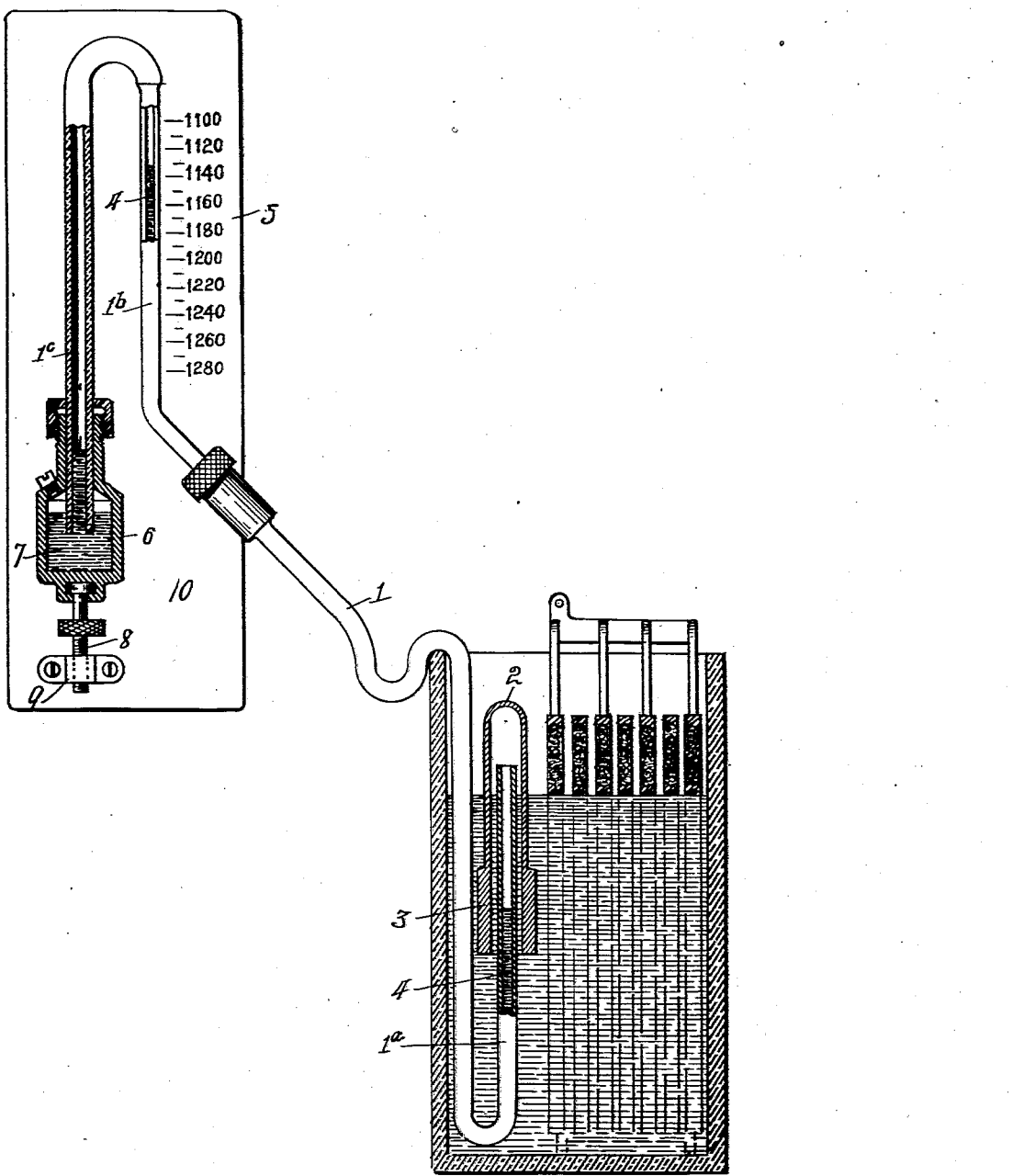

HENRY P. DODGE, OF TOLEDO, OHIO.

SPECIFIC-GRAVITY-MEASURING MEANS.

1,189,431.    Specification of Letters Patent.    Patented July 4, 1916.

Application filed June 30, 1913. Serial No. 776,610.

*To all whom it may concern:*

Be it known that I, HENRY P. DODGE, a citizen of the United States, and a resident of Toledo, in the county of Lucas and State of Ohio, have invented a certain new and useful Specific-Gravity-Measuring Means; and I do hereby declare the following to be a full, clear and exact description of the invention, such as will enable others skilled in the art to which it appertains to make and use the same, reference being had to the accompanying drawings, and to the characters of reference marked thereon, which form a part of this specification.

This invention relates to improved means for finding the specific gravity of the electrolyte of storage batteries whereby to determine the strength of the battery charge, and is particularly designed for use in connection with storage battery driven electric vehicles to indicate to the operator the amount of charge and consequent mileage remaining in the battery, but is not restricted to such use, as it may be used in any connection for which it may be adapted or appropriate.

Various methods, such as ampere hour meters, odometers, voltmeters, etc., have been employed to indicate the amount of charge remaining in a battery, but all of these systems are misleading and are too complicated for the ordinary owner of electric vehicles to understand or bother with, and are therefore more or less objectionable for the use for which the present invention is more particularly intended.

The primary object of my invention is the provision of a simple means or instrumentality, which continuously indicates, in a position where it can be plainly read from the driver's seat in an electric car, the specific gravity of the battery electrolyte, and which in its operation is practically independent of the height of the liquid being read, as this varies considerably from time to time.

The invention is fully described in the following specification, and while, in its broader aspect, it is capable of embodiment in numerous forms, a preferred embodiment thereof is illustrated in the accompanying drawing, which shows a storage battery in vertical section with the device embodying the invention in operative association therewith.

In carrying out the feature of my invention I provide a tube 1, which has an upright 1ª extending down into the battery liquid to be measured as to its specific gravity, and thence leading from the battery to the point where the reading is to be made. The upper end of the upright portion of this tube extends a short distance above the normal height of the battery liquid and is open to the atmosphere except for a sealing agent that is mounted thereon. This agent comprises, in the present instance, a tube or cap-like member 2, which has its top closed and its bottom open and loosely telescoping over the open end of the upright portion of the tube 1 to coöperate with the liquid to provide a liquid seal for the open end of the tube 1. The cap-member 2 preferably has its interior diameter greater than the external diameter of the tube 1 to provide a free space therebetween, and is provided at its open end with a base portion 3 of a nature adapting it to float in the liquid to be measured, but to sink in such liquid as the electric charge therein diminishes in strength, a charged liquid being of greater density than an uncharged battery liquid.

The tube 1, after emerging from the battery, extends to a point which is higher than the top of the battery, as the point of reading in most cases would be above the battery level. A suitable liquid 4, such for instance, as alcohol, partially fills the tube 1 and serves as the indicator of the measuring device, the specific gravity of the battery liquid being read from a scale 5 having graduations with which the top or upper end of the liquid column 4 registers as it rises and falls in the tube upon a vertical movement of the cap-member 2 relative to the portion 1ª of the tube.

Upon a lowering of the member 2 over the tube end, which lowering is occasioned by the lowering of the specific gravity of the battery liquid, the air or other fluid which is present within the upper portion of said member creates a downward pressure on the top of the liquid 4 in the open end of the tube and causes a raising of the upper or indicator end of the liquid 4 within the portion 1ᵇ of the tube, which portion is of glass or other transparent material to expose the liquid therein to view. Accordingly a raising of the member 2, due to an increasing of the specific gravity of the battery liquid will permit a lowering of the indicator end of the liquid in the tube.

Various means may be provided for holding the indicator end of the liquid in the tube 1 above the top of the open end of the tube. One simple means for such purpose is to provide a mercury seal at the opposite end of the tube to the portion thereof over which the float member 2—3 works. To accomplish this the tube 1 is bent downward at a point above the highest point of movement of the indicator end of the liquid column therein, as shown by the dependent end portion 1ᶜ thereof, and the lower end of the portion opens into a cup or receptacle 6 for containing mercury 7, which extends up into the tube for a greater or less extent depending upon the position of the indicator end of the liquid column in the tube. A column of air is interposed between the upper end of the liquid column 4 and mercury, so that upon a raising of such end of the liquid column the air column will move therewith and cause a lowering of the mercury column which extends up within the tube. Accordingly it will be understood that upon a lowering of the indicator end of the liquid within the tube the mercury will rise therein.

The mercury cup 6 preferably has a sliding fit on the tube end, to enable the tube and cup to have relative longitudinal adjustment to adjust the indicator end of the liquid column relative to the scale graduations, as an accurate registering of the specific gravity of the liquid being measured may require. This adjustment is effected by turning a screw 8, which swively depends from the bottom of the mercury cup and has its lower end threaded through a stationary part 9 that is carried by an adjacent support, which, in the present instance, is the plate 10 on which the scale graduations are noted.

From the description it will be understood that as the specific gravity of the liquid being measured increases the float member 2—3 will rise relative to the end portion 1ᵃ of the tube 1 over which it works, thus relieving or lessening the fluid pressure within the upper end portion of such member, which pressure bears down upon the associated end of the liquid column 4, and permitting a lowering of the indicator end of the liquid column; and also that the reducing of the specific gravity of the liquid permits a lowering of the float member 2—3 and a consequent rising of the indicator end of the liquid column, due to the fluid pressure which is exerted on the opposite end of the liquid column by the lowering of the float member. The mercury rises and lowers in the end portion 1ᶜ of the tube in unison with the longitudinal movements of the liquid 4 therein but not to the same extent as the movement of the liquid 4, owing to the greater weight of the mercury column. This differential movement of the liquid 4 and mercury within the tube may be increased by reducing the size of the tube passage in which the indicator end of the liquid works.

It is evident that I have provided a simple and efficient apparatus for measuring the specific gravity of the electrolyte of storage batteries or of other fluids, and that it can be easily read at a distance from the liquid being measured, thus admirably adapting it for use in electric automobiles or the like.

It will be understood that my apparatus is intended to indicate the condition of the charge in the storage battery. When all of the acid is out of the plates and in the electrolyte and the electrolyte is at the proper height, which height is predetermined, the gravity should be 1.280. If the liquid is at a different height an error will occur which will be exactly offset by the fact that the specific gravity of the acid is also changed due to the difference in the amount of liquid present. If the float is properly proportioned the error due to the difference in height of the electrolyte will offset the error, due to the fact that the specific gravity is necessarily lower when pure water is added. Nothing but pure water should be added to or evaporated from a storage battery.

I wish it understood that my invention is not limited to any specific construction or arrangement of the parts except in so far as such limitations are specified in the claims.

Having thus described my invention, what I claim as new, and desire to secure by Letters Patent, is,—

1. A device for measuring the density of liquids comprising means forming a passage leading to a point remote from the fluid being measured, a fluid in said passage, and a member for floating in the fluid being measured and having a hollow part receiving a portion of said means with its hollow in communication with said passage, whereby a movement of said float member relative to said means effects a movement of the indicator fluid in said passage.

2. In a device of the class described, a float member for rising and sinking in a liquid as the specific gravity thereof changes, said member having a chamber closed by the liquid and varying in size as the member rises and falls therein whereby the liquid pressure in the hollow part varies accordingly, and means forming a passage having a liquid therein with one end of the passage opening within the hollow of said member whereby the liquid within the passage moves lengthwise therein as the pressure in the float member varies upon a rising or sinking of such member in the liquid being measured.

3. A device of the class described having relatively movable floating and tube members, with the floating member forming a closed pressure chamber over a portion of the tube member whereby an indicating fluid in the tube member has its movements therein controlled by a movement of the floating member relative to the tube member.

4. A device of the class described having a floating member provided with a pressure chamber, the size of which is varied by a rising and sinking of the member in a liquid, the specific gravity of which is being determined, a member forming a passage for an indicating fluid and having a stationary part projecting into the float chamber with its passage in communication with the interior of such chamber, and an indicator fluid in such passage having its movement therein controlled by movements of the floating member relative to the part projecting therein, due to the varying of the pressure within the floating member chamber occasioned by rising and sinking movements thereof in the liquid the specific gravity of which is being determined.

5. A device of the class described having a member forming a passage open at one end and extending into a liquid the specific gravity of which is being measured, and thence to a point remote from the liquid, an indicator fluid in said passage, means for rising and sinking in the liquid to be measured as the specific gravity of such liquid changes, said means having a closed chamber in communication with the passage of said member, the size of such chamber varying as the means rises and sinks in the liquid whereby pressure within the chamber varies and controls the movement of the indicator fluid in said passage.

6. A device of the class described comprising a hollow floating member in which fluid pressure therein varies according to the density of the liquid in which it floats, a tubular member, means forming a passage with a part of the passage opening into the hollow portion of said member whereby the interior pressure of said member is felt within the adjacent end of such passage, said member being movable relative to said passage, and means controlled by the movement of said member relative to said passage means for indicating the varying pressures at a remote point in said means.

7. A device of the class described comprising a hollow floating member the interior fluid pressure of which varies according to the density of the liquid in which it floats, a member forming a passage which opens into the hollow of said floating member, and means for reading the varying pressures at a remote point in the passage member, said means being controlled by rising and sinking movements of the floating member in the liquid in which it floats.

8. A device of the class described comprising a hollow floating member, the interior fluid pressure of which varies according to the density of the liquid in which it floats, a member forming a passage which opens into the hollow of said floating member, means for reading the varying pressures at a remote point in the passage member, said means being controlled by movements of the floating member in the liquid in which it floats, and means for adjusting said last mentioned means relative to the passage member.

9. A device of the class described having a passage member having one end open, an adjustable closure member for the other end of said member, a fluid in said tube having an indicator part which is movable by an adjusting of said closure member, and a cap part reciprocally fitting over the open end of said passage member and capable of floating in a liquid the specific gravity of which is to be measured, said cap part having its interior closed to the atmosphere so that the fluid pressure therein varies according to the density of the liquid in which it floats and controls the indicating movements of the fluid in the passage member.

10. In an automobile, a storage battery, a hollow member floating in the liquid of the battery, a tube having one end terminating in said floating member whereby a rising and falling of the member varies the pressure within the adjacent end of the tube, said tube having its other end leading up and attached to the automobile at a point where it can be seen by the driver, and an indicator fluid within said tube and having its movement therein controlled by the movement of the hollow member.

11. In a device of the class described, a tube, a liquid seal closing one end of said tube, a column of indicator liquid held at a convenient point within the tube by means of said seal, a hollow member movably connected with the other end of said tube and floating in the liquid the specific gravity of which is to be measured, the hollow of said member being closed by the liquid in which it floats, whereby the interior pressure of the member against the liquid column in the tube varies as the member rises or sinks in the liquid in which it floats, the liquid seal and the liquid within the tube automatically adjusting themselves as the pressure within the floating member varies.

In testimony whereof, I have hereunto signed my name to this specification in the presence of two subscribing witnesses.

HENRY P. DODGE.

Witnesses:
C. W. OWEN,
S. T. KLOTZ.